United States Patent
Shin et al.

(10) Patent No.: US 12,087,978 B2
(45) Date of Patent: Sep. 10, 2024

(54) MULTIPLE PERFORATION PLATE FOR FUEL CELL SEPARATORS

(71) Applicants: Hyundai Motor Company, Seoul (KR); Kia Corporation, Seoul (KR)

(72) Inventors: Woo Chul Shin, Goyang-si (KR); Kyung Min Kim, Namyangju-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 221 days.

(21) Appl. No.: 17/346,516

(22) Filed: Jun. 14, 2021

(65) Prior Publication Data

US 2022/0209254 A1 Jun. 30, 2022

(30) Foreign Application Priority Data

Dec. 29, 2020 (KR) .......... 10-2020-0186306

(51) Int. Cl.
*H01M 8/026* (2016.01)
*H01M 8/0247* (2016.01)

(52) U.S. Cl.
CPC ......... *H01M 8/026* (2013.01); *H01M 8/0247* (2013.01)

(58) Field of Classification Search
None
See application file for complete search history.

(56) References Cited

U.S. PATENT DOCUMENTS

| 6,379,833 B1* | 4/2002 | Hill ................. H01M 8/142 429/464 |
| 6,541,145 B2* | 4/2003 | Wilkinson .......... H01M 8/0258 429/513 |
| 10,320,008 B2 | 6/2019 | Jin et al. |
| 2009/0214929 A1* | 8/2009 | Gao .................... H01M 8/0267 429/457 |
| 2010/0009233 A1* | 1/2010 | Blanchet ............. H01M 8/0206 429/415 |
| 2011/0299221 A1 | 12/2011 | Higashi et al. |
| 2013/0288161 A1* | 10/2013 | Ohtani ................ H01M 8/0245 429/514 |
| 2016/0344044 A1* | 11/2016 | Jin ...................... H01M 8/0254 |

FOREIGN PATENT DOCUMENTS

| JP | 5470232 B2 | 4/2014 |
| KR | 20110133431 A | 12/2011 |
| KR | 101684115 B1 | 12/2016 |

* cited by examiner

*Primary Examiner* — Alix E Eggerding
(74) *Attorney, Agent, or Firm* — Slater Matsil, LLP (57) ABSTRACT

A multiple perforation plate for fuel cell separators includes virtual flow path hole central lines spaced apart from each other at a constant interval in a length direction corresponding to a flow direction of reaction gas and formed in a width direction perpendicular to the flow direction of the reaction gas, a plurality of flow path holes formed at a constant interval on the flow path hole central lines in the width direction, and expansion parts formed at both sides of a middle point of each of the flow path holes in the width direction so as to have a greater width in the length direction than that of other points of each of the flow path holes.

20 Claims, 8 Drawing Sheets

FIG. 1

-PRIOR ART-

FIG. 2

-PRIOR ART-

FIG. 3A

-PRIOR ART-

FIG. 3B

-PRIOR ART-

MULTIPLE PERFORATION PLATE FOR FUEL CELL SEPARATORS

CROSS-REFERENCE TO RELATED APPLICATIONS

This application claims the benefit of Korean Patent Application No. 10-2020-0186306, filed in the Korean Intellectual Property Office on Dec. 29, 2020, which application is hereby incorporated herein by reference.

TECHNICAL FIELD

The present invention relates to a multiple perforation plate for fuel cell separators.

BACKGROUND

A fuel cell is a kind of power generation system, which converts chemical energy of fuel into electrical energy using an electrochemical reaction in a stack, and may be used not only to supply driving power for industrial use, home use and vehicles but also to supply power to small electronic products, such as portable devices, and recently, the range of application of fuel cells, as a clean and high-efficiency energy source, is gradually expanding.

In a general fuel cell stack, a membrane electrode assembly (MEA) is located at the innermost position, and the membrane electrode assembly includes a polymer electrolyte membrane configured to move protons, and catalyst layers applied to both surfaces of the electrolyte membrane so that hydrogen and oxygen react therewith, i.e., a cathode (or an air electrode) and an anode (or a fuel electrode).

Further, gas diffusion layers (GDLs) are stacked on the outer surfaces of the membrane electrode assembly, i.e., the outer portions of the membrane electrode assembly at which the cathode and the anode are located, separators provided with flow fields configured such that fuel is supplied and water produced through the reaction is discharged therethrough are located outside the gas diffusion layers with gaskets interposed between the separators and the gas diffusion layers, and end plates configured to support and fix these elements are coupled to the outermost portions of the membrane electrode assembly.

Therefore, the oxidation reaction of hydrogen occurs at the anode of the fuel cell stack and thus generates protons and electrons, the protons and the electrons are moved to the cathode through the electrolyte membrane and an external circuit, respectively, and water is produced at the cathode by an electrochemical reaction between the protons and the electrons, moved from the anode to the cathode, and oxygen in air, and simultaneously electrical energy is generated due to the flow of the electrons.

The separators are generally manufactured in a structure in which lands closely supported by the gas diffusion layer and channels serving as a flow path of fluid are repeated.

That is, because a general separator has a structure in which lands and channels are formed through repeated bending, the channels located on one surface of the separator facing the gas diffusion layer are used as spaces in which reaction gas, such as hydrogen or air, flows, the channels located on the other surface of the separator are used as spaces in which cooling water flows, and therefore, one separator having hydrogen/cooling water channels and one separator having air/cooling water channels, i.e., a total of two separators, may constitute one unit cell.

In recent times, unlike the conventional general separators, research on a porous separator which forms turbulence of reaction gas and further facilitates diffusion of the reaction gas to a gas diffusion layer is being conducted.

The above information disclosed in the Background section is only for enhancement of understanding of the background of the invention and should not be interpreted as conventional technology that is already known to those skilled in the art.

SUMMARY

The present invention relates to a multiple perforation plate for fuel cell separators. Particular embodiments relate to a multiple perforation plate for fuel cell separators which may reduce damage due to contact between a gas diffusion layer and a membrane electrode assembly and increase contact resistance.

Embodiments of the present invention have been made in view of problems in the art, and an embodiment of the present invention provides a multiple perforation plate for fuel cell separators which may reduce damage due to contact between a gas diffusion layer and a membrane electrode assembly and increase contact resistance.

In accordance with embodiments of the present invention, provided is a multiple perforation plate for fuel cell separators, in which virtual flow path hole central lines spaced apart from each other at a constant interval in a length direction corresponding to a flow direction of reaction gas and formed in a width direction perpendicular to the flow direction of the reaction gas are defined, a plurality of flow path holes is formed at a constant interval on the flow path hole central lines in the width direction, and expansion parts are formed at both sides of a middle point of each of the flow path holes in the width direction so as to have a greater width in the length direction than that of other points of each of the flow path holes.

Among the flow path holes, flow path holes formed on an $n^{th}$ flow path hole central line $C_n$ may be arranged at positions located between flow path holes formed on an $n+1^{th}$ flow path hole central line $C_{n+1}$ and aligned with flow path holes formed on an $n+2^{th}$ flow path hole central line $C_{n+2}$, so that the flow path holes are arranged in a zigzag pattern in the length direction, among an interval between the flow path holes disposed on the flow path hole central lines disposed $n+1^{th}$ nearest to each other and formed at positions corresponding to each other in the width direction, an interval L5 between points of the respective flow path holes provided with the expansion parts may be less than an interval L1 between points of the respective flow path holes other than the expansion parts, and n may be an odd natural number.

The expansion parts may be respectively expanded from the sides of the middle point of each of the flow path holes in the length direction by a designated width L4, compared to a width L3 of the flow path holes in the length direction, and an interval L2 between corresponding points of the flow path holes disposed on the flow path hole central lines disposed $n^{th}$ nearest to each other, other than middle points thereof in the width direction, may be greater than the width L4 of each of the expansion parts from a corresponding one of the sides of the flow path holes.

The width L4 of each of the expansion parts from the corresponding one of the sides of the flow path holes may be greater than ⅔ of the interval L2 between the corresponding points of the flow path holes disposed on the flow path hole central lines disposed $n^{th}$ nearest to each other, other than the middle points thereof in the width direction, but may be less than the interval L2 between the corresponding points of the flow path holes disposed on the flow path hole central lines disposed $n^{th}$ nearest to each other, other than the middle points thereof in the width direction.

The interval L2 between the corresponding points of the flow path holes disposed on the flow path hole central lines disposed $n^{th}$ nearest to each other, other than the middle points thereof in the width direction, may be greater than ½ of the width L3 of the flow path holes in the length direction, but may be less than the width L3 of the flow path holes in the length direction.

The expansion parts may be formed in one of a triangular shape, a rectangular shape, a square shape, a semi-hexagonal shape, a semi-circular shape and a semi-oval shape.

The multiple perforation plate may be formed in an uneven shape configured such that a wave-shaped cross-section is repeated in the flow direction of the reaction gas by repeatedly bending a region of the $n^{th}$ flow path hole central line $C_n$ upwards and bending a region of the $n+^{th}$ flow path hole central line $C_{n+1}$ downwards, and, among an interval between the flow path holes disposed on the flow path hole central lines disposed $n+1^{th}$ nearest to each other and formed at positions corresponding to each other in the width direction, an interval L5 between points of the respective flow path holes provided with the expansion parts may satisfy Expression 1 below.

$$L5 \leq H/\sin\theta \quad \text{[Expression 1]}$$

H may indicate a height between upper ends and lower ends of bent portions of the multiple perforation plate, and θ may indicate an angle between a virtual line corresponding to the interval L5 and a virtual line formed by connecting the lower ends of the bent portions of the multiple perforation plate.

The height H may satisfy an expression 0.25 mm≤H≤0.6 mm, and the angle θ may satisfy an expression 30°≤θ≤90°.

A pitch P between the flow path holes disposed on the flow path hole central lines disposed $n+1^{th}$ nearest to each other may satisfy an expression 0.5 mm≤P≤1.5 mm.

BRIEF DESCRIPTION OF THE DRAWINGS

The above and other objects, features and other advantages of embodiments of the present invention will be more clearly understood from the following detailed description taken in conjunction with the accompanying drawings, in which.

DETAILED DESCRIPTION OF ILLUSTRATIVE EMBODIMENTS

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to the exemplary embodiments. Wherever possible, the same reference numbers will be used throughout the drawings to refer to the same or like parts.

Figure 1:
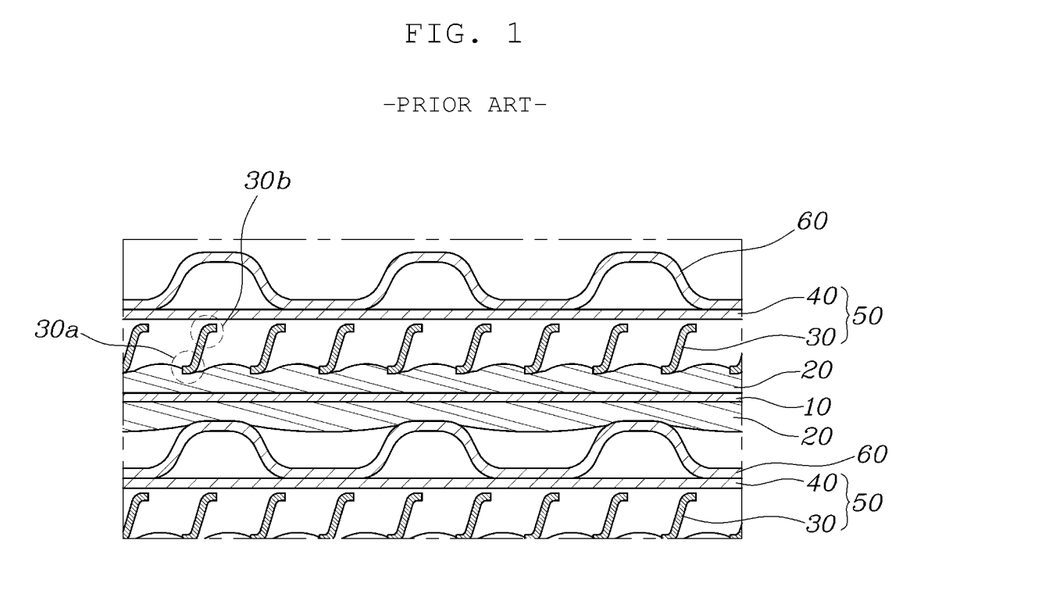
FIG. 1 is a schematic cross-sectional view illustrating a fuel cell stack to which general porous separators are applied.
Figure 2:
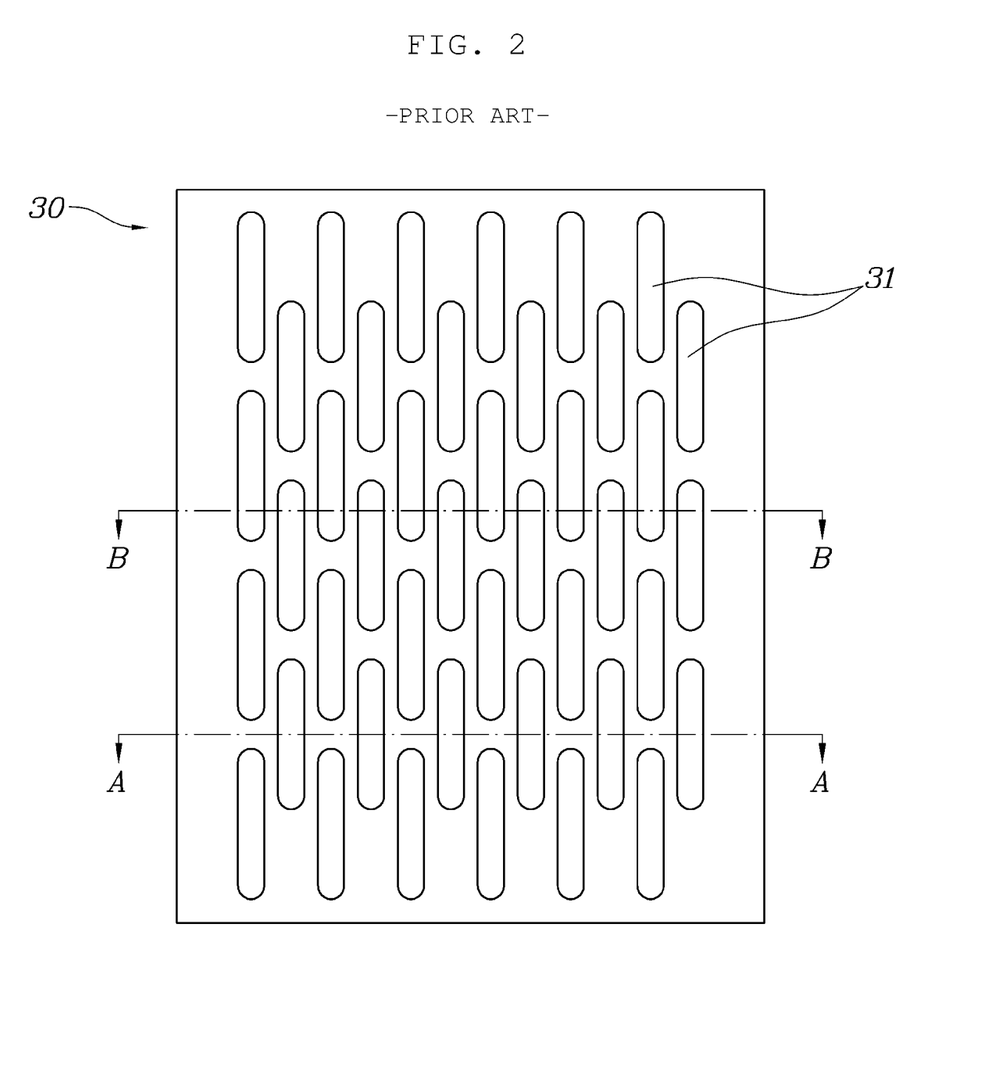
FIG. 2 is a plan view of a multiple perforation plate of the general porous separator.
Figure 3A:
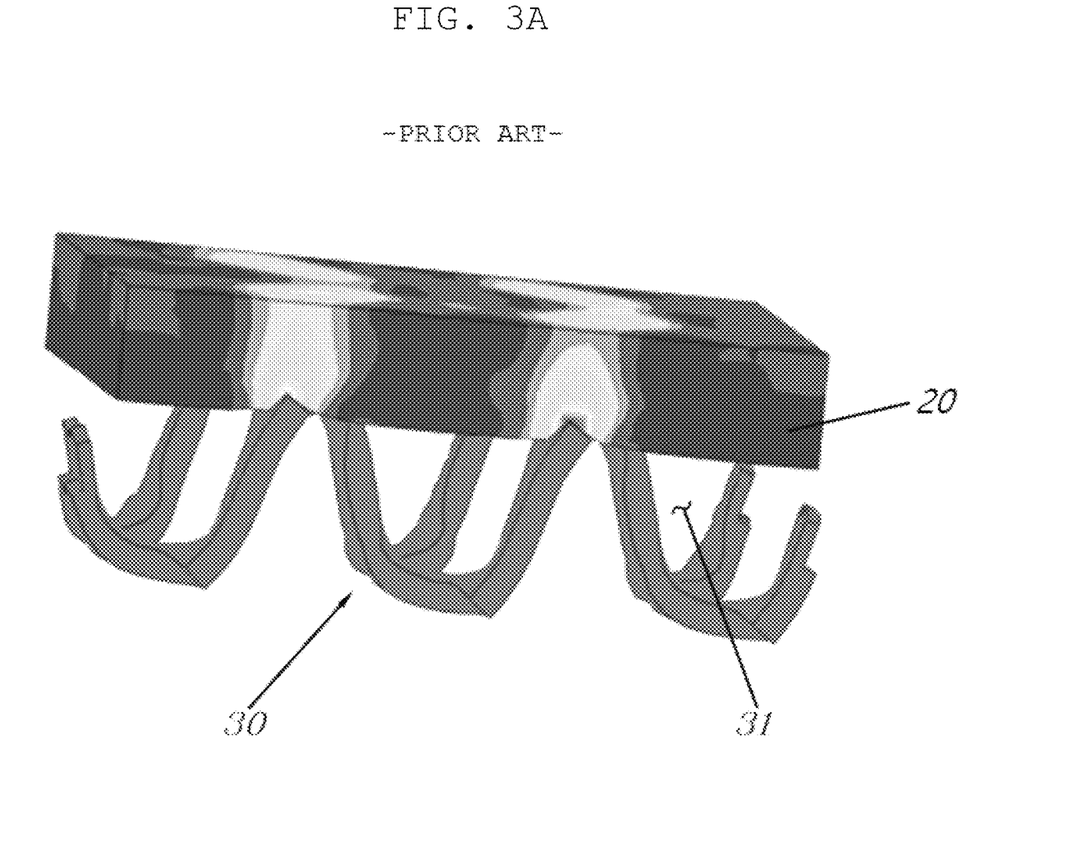
FIGS. 3A and 3B are views respectively illustrating states of stress concentration between the multiple perforation plate and a gas diffusion layer.
Figure 3B:
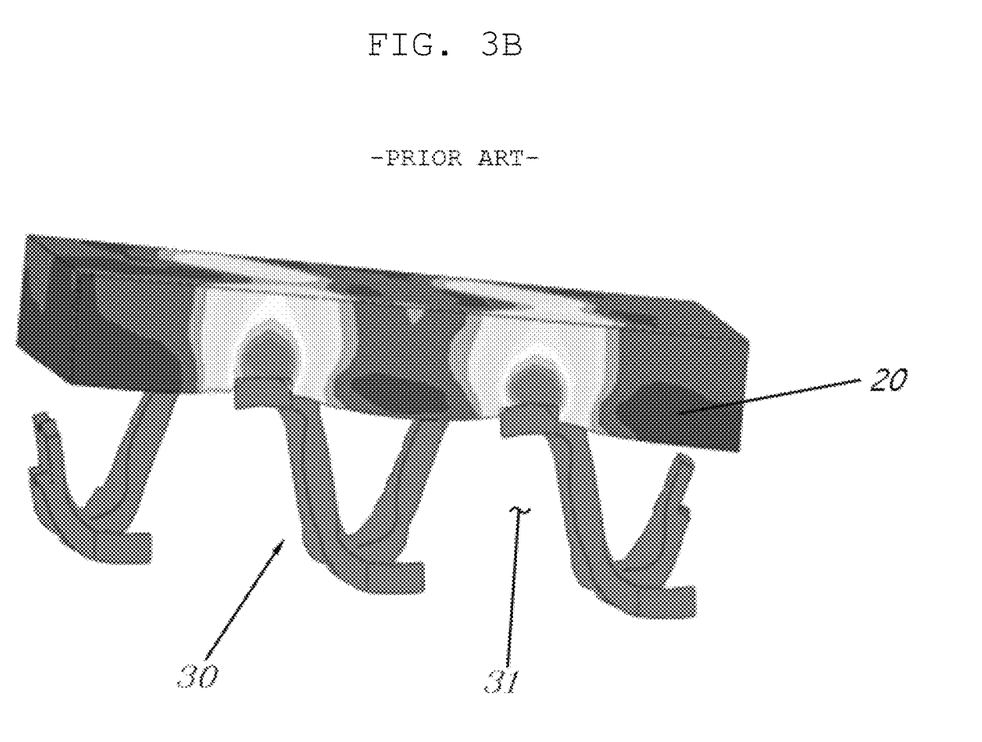

FIG. 1 is a schematic cross-sectional view illustrating a fuel cell stack to which general porous separators are applied, FIG. 2 is a plan view of a multiple perforation plate of the general porous separator, and FIGS. 3A and 3B are views respectively illustrating states of stress concentration between the multiple perforation plate and a gas diffusion layer.

In the same manner as the above-described general fuel cell stack, in the fuel cell stack to which the porous separators are applied, a membrane electrode assembly 10 is located at the innermost position, and gas diffusion layers 20 are stacked on the outer surfaces of the membrane electrode assembly 10.

Further, separators are disposed outside the gas diffusion layers 20 so as to supply fuel and to discharge water produced by reaction therethrough, and in this case, porous separators 50 are employed as the separators.

Here, porous separators 50 may be applied to both a cathode and an anode, or a porous separator 50 may be applied to the cathode and a separator 60 in which channels and flow fields are formed may be applied to the anode.

The porous separator 50 broadly includes a multiple perforation plate 30 and a flat plate 40.

The multiple perforation plate 30 has a wave-shaped cross-section in the flow direction of reaction gas, and is formed such that first contact portions 3oa coming in contact with the gas diffusion layer 20 and second contact portions 30b coming in contact with the flat plate 40 are repeated, and a plurality of flow path holes 31 through which the reaction gas passes is formed in a zigzag pattern, as shown in FIG. 2.

The flat plate 40 serves as a diaphragm for hydrogen or air channels.

Therefore, as the reaction gas passes through the flow path holes 31 of the porous separator 50, the reaction gas flows upwards and downwards along the wave-shaped cross-section of the multiple perforation plate 30 and simultaneously flows leftwards and rightwards and may thus forcibly provide turbulence in the flow of the reaction. The turbulence of the reaction gas is transmitted to the gas diffusion layer 20 and may thus increase the amount of diffused gas and consequently improve the performance of the fuel cell.

The multiple perforation plate 30 is a three-dimensional structure which includes the flow path holes 31 formed in a thin metal plate so as to form the wave-shaped cross-section, and is mass-produced by forming the flow path holes 31 in the thin metal plate and then executing press working.

Because of the structural characteristics of the multiple perforation plate 30, flat portions are formed in the part indicated by line A-A of FIG. 2 so as to come in surface contact with the gas diffusion layer 20, bent portions are formed in the part indicated by line B-B of FIG. 2 so as to come into linear contact or point contact with the gas diffusion layer 20, and thus, more stress is concentrated upon the part indicated by line B-B than upon the part indicated by line A-A.

FIG. 3A is a view illustrating a state of stress concentration in a region of the part indicated by line A-A, which comes in contact with the gas diffusion layer, FIG. 3B is a view illustrating a state of stress concentration in a region of the part indicated by line B-B, which comes in contact with the gas diffusion layer, and it may be confirmed that more stress is concentrated on the part indicated by the line B-B than upon the part indicated by the line A-A.

Therefore, at the part indicated by the line B-B, diffusion of the reaction gas and discharge of water may be reduced and, furthermore, the membrane electrode assembly at the part indicated by the line B-B may be physically damaged.

A multiple perforation plate for fuel cell separators according to one embodiment of the present invention is a multiple perforation plate forming a porous separator in which one surface of the multiple perforation plate is in contact with a gas diffusion layer and the other surface of the multiple perforation plate is in contact with a flat plate, thereby forming turbulence of reaction gas and thus enabling the reaction gas to more easily diffuse to the gas diffusion layer.

In this embodiment, the shape of flow path holes formed in the multiple perforation plate is improved in order to increase the area of flat portions coming in contact with the gas diffusion layer when a fuel cell stack is formed.

Figure 4:
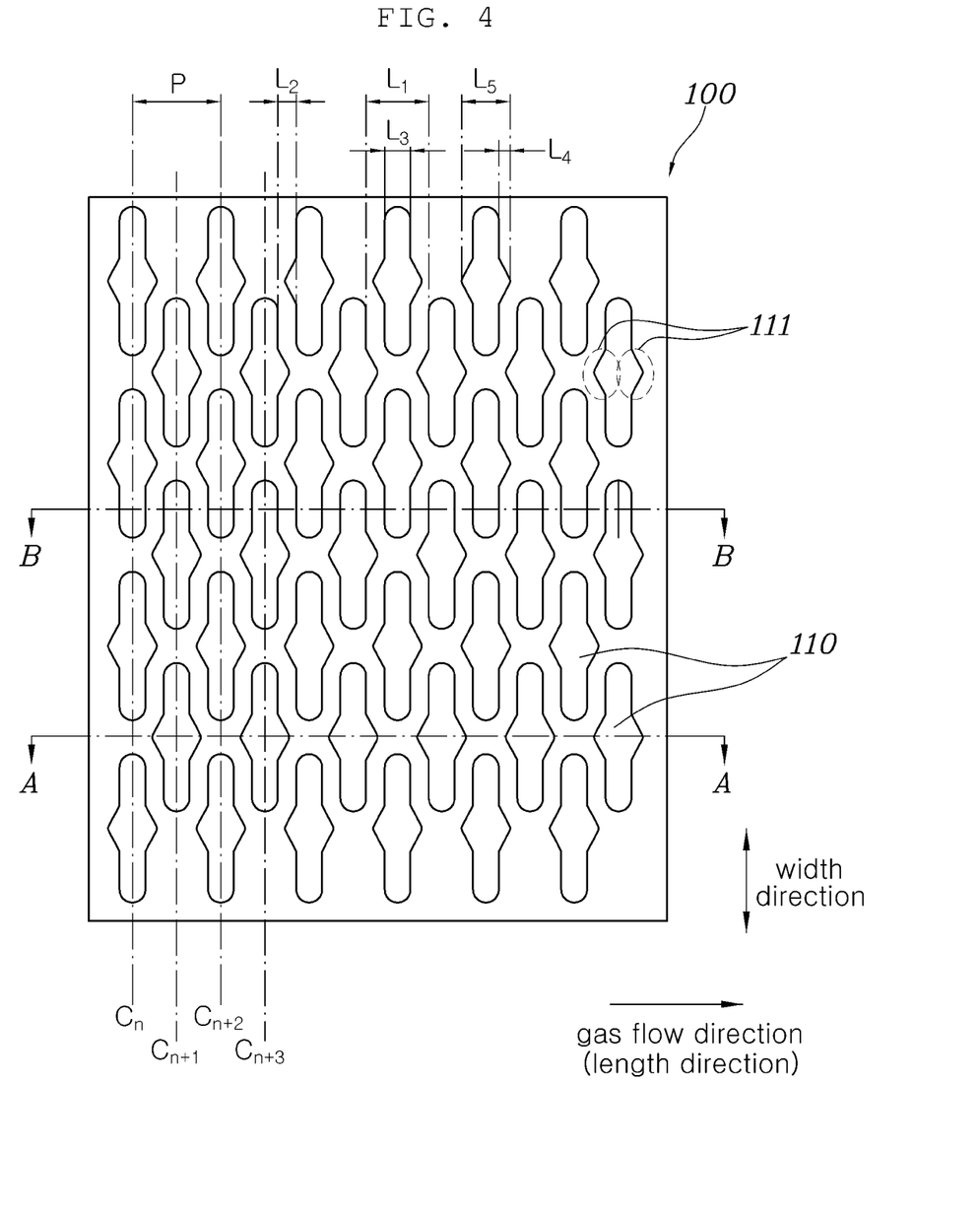
FIG. 4 is a plan view illustrating a multiple perforation plate for fuel cell separators according to one embodiment of the present invention.
Figure 5:
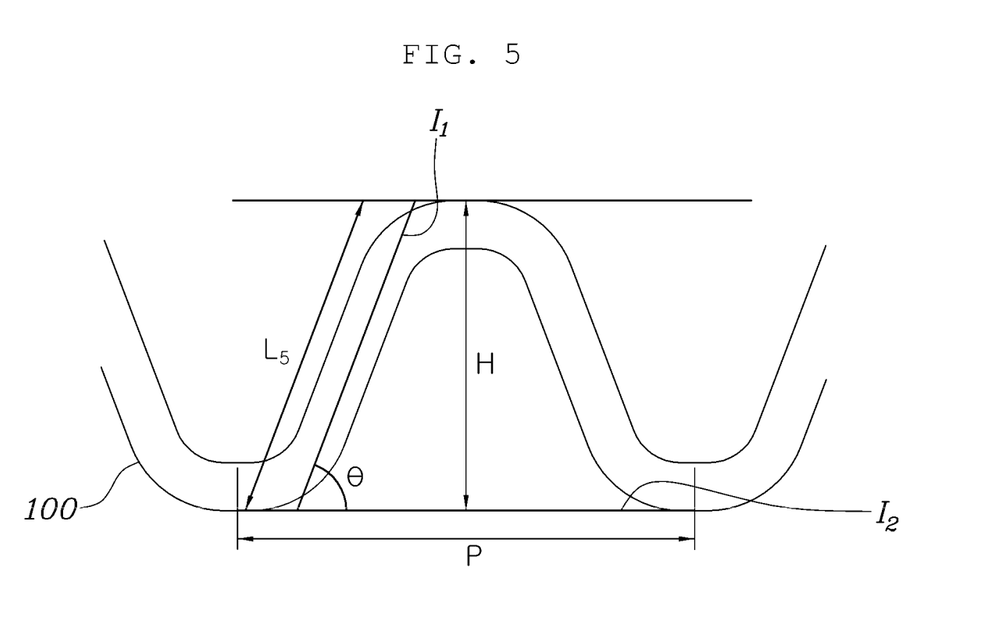
FIG. 5 is a cross-sectional view of the multiple perforation plate for fuel cell separators according to one embodiment of the present invention.
Figure 6A:
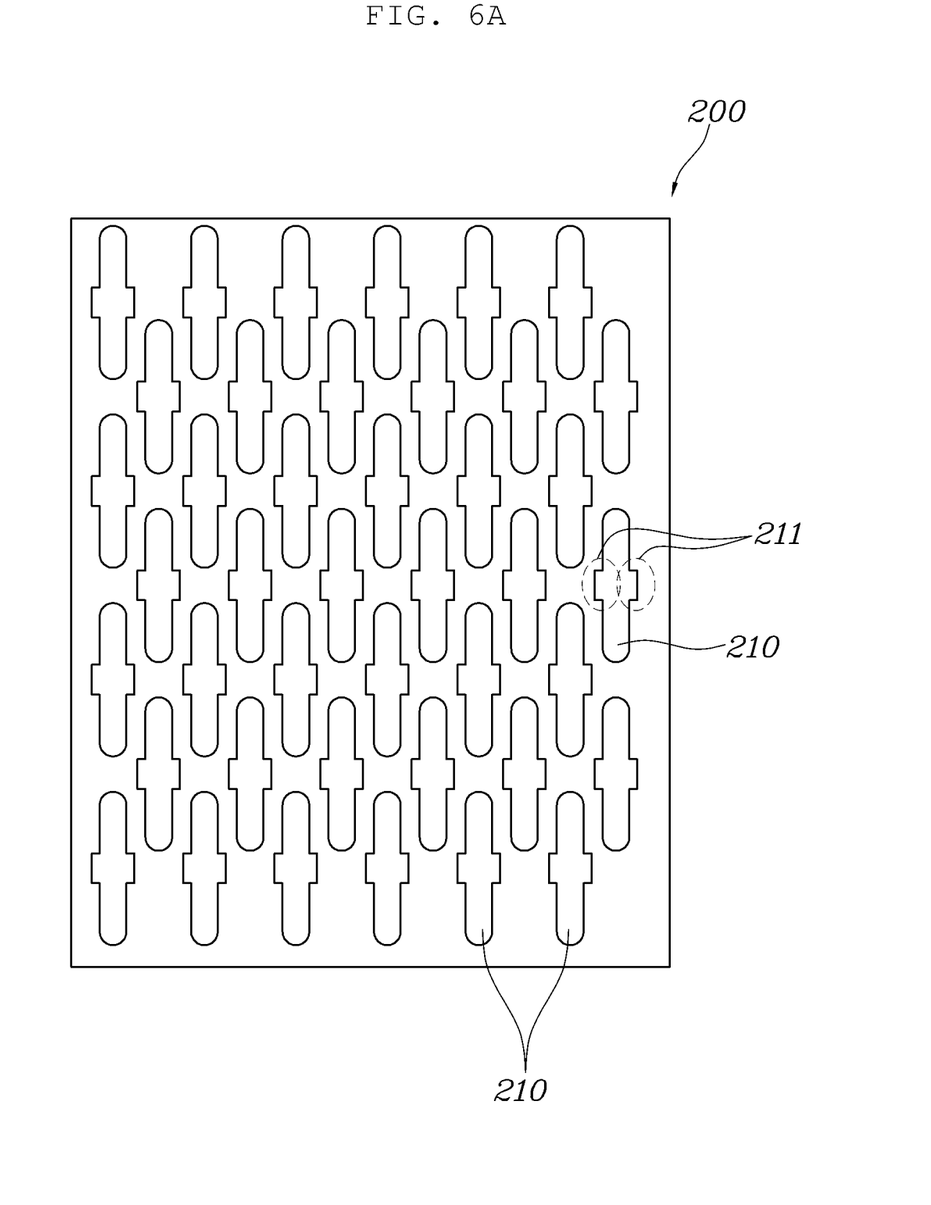
FIGS. 6A and 6B are plan views illustrating multiple perforation plates for fuel cell separators according to other embodiments of the present invention.
Figure 6B:
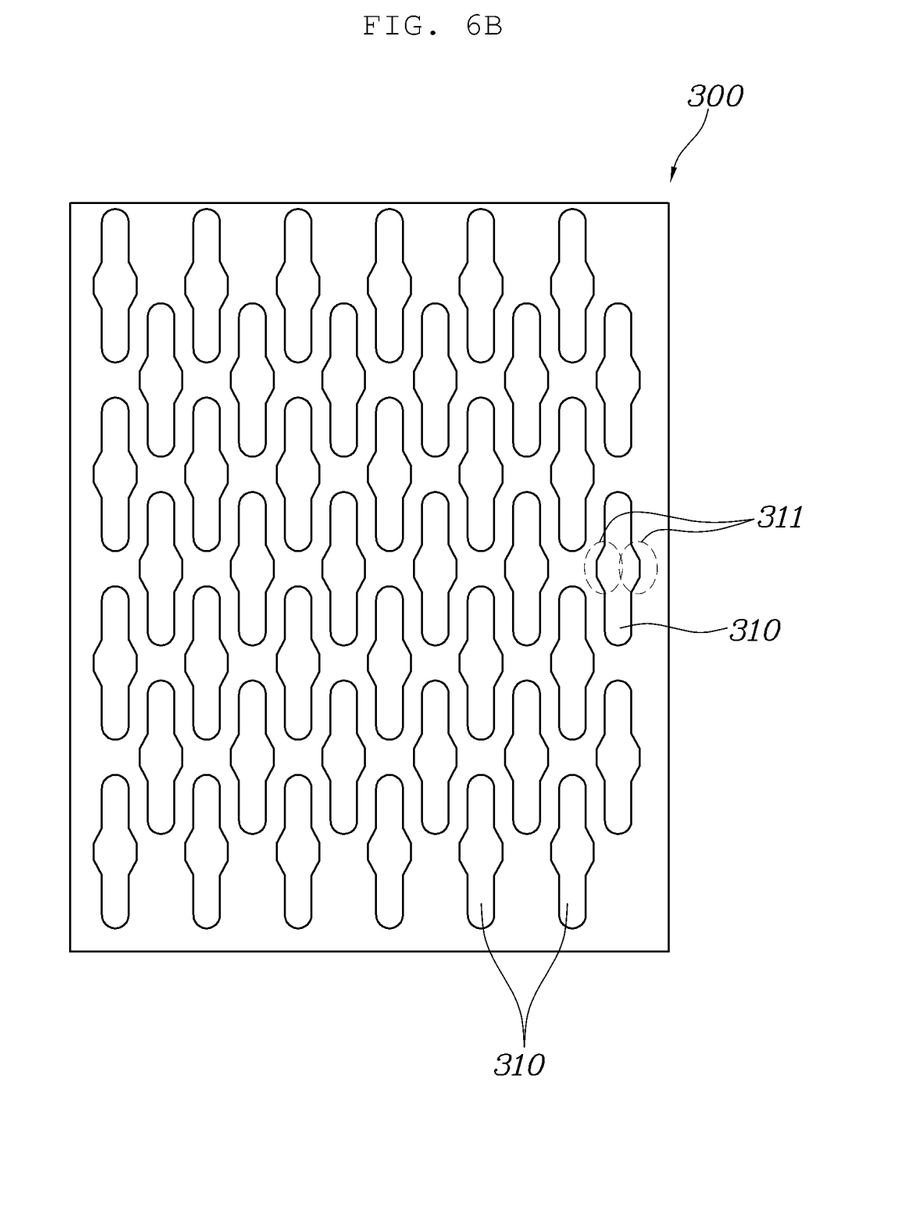

FIG. 4 is a plan view illustrating a multiple perforation plate for fuel cell separators according to one embodiment of the present invention, FIG. 5 is a cross-sectional view of the multiple perforation plate for fuel cell separators according to one embodiment of the present invention, and FIGS. 6A and 6B are plan views illustrating multiple perforation plates for fuel cell separators according to other embodiments of the present invention.

As shown in FIGS. 4 and 5, in a multiple perforation plate 100 for fuel cell separators according to one embodiment of the present invention, a plurality of flow path holes 110 through which reaction gas passes is arranged in a zigzag pattern in the flow direction of the reaction gas. Here, the multiple perforation plate 100 is formed in an uneven shape in which a wave-shaped cross-section is repeated in the flow direction of the reaction gas.

In addition, in the multiple perforation plate 100, virtual flow path hole central lines $C_n, C_{n+1}, C_{n+2}, C_{n+3}, \ldots$, which are spaced apart from each other at the same interval in the length direction, i.e., the flow direction of the reaction gas, and are formed in the width direction perpendicular to the flow direction of the reaction gas, are defined, and the flow path holes 110 are formed at the same interval on the flow path hole central lines $C_n, C_{n+1}, C_{n+2}, C_{n+3}, \ldots$ in the width direction.

For example, the flow path holes 110 formed on the $n^{th}$ flow path hole central line $C_n$ in the length direction are arranged at positions which are located between the flow path holes 110 formed on the $n+1^{th}$ flow path hole central line $C_{n+1}$, and are aligned with the flow path holes 110 formed on the $n+2^{th}$ flow path hole central line $C_{n+2}$, and thus, the flow path holes 110 formed on the $n^{th}$ flow path hole central line $C_n$, the flow path holes 110 formed on the $n+1^{th}$ flow path hole central line $C_{n+1}$, and the flow path holes 110 formed on the $n+2^{th}$ flow path hole central line $C_{n+2}$ are arranged in a zigzag pattern in the length direction. Here, n is an odd natural number.

Here, the flow path holes 110 are formed as slits, which extend in the width direction, on the flow path hole central lines $C_n, C_{n+1}, C_{n+2}, \ldots$. However, expansion parts 111 are formed at both sides of a middle point of each of the flow path holes 110 in the width direction so as to have a greater width in the length direction than that of other points of each of the flow path holes 110.

Hereinafter, for clear description, reference marks stated in FIGS. 4 and 5 will first be described.

In FIG. 4, L1 (hereafter referred to as "first length") indicates an interval between regions of the flow path holes 110 other than the expansion parts 111 disposed on the flow path hole central lines disposed $n+1^{th}$ nearest to each other (for example, the flow path hole central lines $C_n$ and $C_{n+2}$) and formed at positions corresponding to each other in the width direction, L2 (hereafter referred to as "second length") indicates an interval between the flow path holes 110 disposed on the flow path hole central lines disposed nearest to each other (for example, the flow path hole central lines $C_n$ and $C_{n+1}$), L3 (hereafter referred to as "third length") indicates the width of the flow path hole 110 in a region other than the expansion part 111 in the length direction, L4 (hereinafter referred to as "fourth length") indicates the width of the expansion part 111 protruding from one side of the flow path hole 110, and L6 (hereinafter referred to as "fifth length") indicates an interval between regions of the flow path holes 110 provided with the expansion parts 111 disposed on the flow path hole central lines disposed $n+1^{th}$ nearest to each other (for example, the flow path hole central lines $C_n$ and $C_{n+2}$) and formed at positions corresponding to each other in the width direction.

Further, in FIG. 5, P (hereinafter referred to as "flow path hole pitch") indicates a pitch between the flow path holes 110 disposed on the flow path hole central lines disposed $n+1^{th}$ nearest to each other (for example, the flow path hole central lines $C_n$ and $C_{n+2}$), H (hereinafter referred to as "multiple perforation plate height") indicates a height between the upper ends and the lower ends of bent portions of the multiple perforation plate 100, and θ (hereinafter referred to as "channel angle") indicates an angle between a virtual line I1 corresponding to the fifth length L5 and a virtual line I2 connecting the lower ends of the bent portions.

In this embodiment, as described above, the shape of flow path holes 110 formed in the multiple perforation plate 100 is improved in order to increase the area of flat portions coming in contact with a gas diffusion layer when a fuel cell stack is formed, and the area of the flat portions of the multiple perforation plate 100 coming in contact with the gas diffusion layer when the fuel cell stack is formed may be increased by increasing the second length L2 under the condition that the fifth length L5 satisfies Expression 1 below:

$$L5 \leq H/\sin\theta \quad \text{[Expression 1]}$$

When the fifth length L5 increases above the value of H/sin θ, no flat portions may be generated due to limits in the method for forming the multiple perforation plate 100, the flow path holes 110 may not formed at desired positions, but may deviate from the desired positions forwards or rearwards in the length direction, or the intended channel angle θ of the multiple perforation plate 100 may not be assured.

In order to satisfy the above Expression 1 while increasing the second length L2, in this embodiment, each of the flow path holes 110 has expansion parts 111 formed at both sides of a middle point thereof so as to have a greater width in the length direction than that of other points thereof, rather than a simple slit-type rectangular shape having both semicircular ends in the width direction. For example, as shown in FIG. 4, each of the flow path holes 110 maintains the slit-type rectangular shape having both semicircular ends in the width direction, and includes triangular expansion parts 111 formed at both sides of the middle point thereof so as to have an increased width in the length direction. Further, flow path holes 211, each of which includes rectangular or square expansion parts 211, may be formed, as shown in FIG. 6A, or flow path holes 311, each of which includes semi-hexagonal expansion parts 311, may be formed, as shown in FIG. 6B. Further, although not shown in the drawings, the expansion parts may be formed in various shapes configured to have a greater width in the length direction than that of other points of the flow path hole, for example, a circular shape, a semicircular shape, etc.

The flow path hole pitch P between the flow path holes 110 disposed on the flow path hole central lines disposed n+1$^{th}$ nearest to each other (for example, the flow path hole central lines $C_n$ and $C_{n+2}$) may satisfy the expression 0.5 mm≤P≤1.5 mm.

Further, the multiple perforation plate height H indicating the height between the upper ends and the lower ends of the bent portions of the multiple perforation plate 100 may satisfy the expression 0.25 mm≤H≤0.6 mm, and the channel angle θ indicating the angle between the virtual line I1 corresponding to the fifth length L5 and a virtual line I2 formed by connecting the lower ends of the bent portions may satisfy the expression 30°≤θ≤90°.

Here, in this embodiment, when the flow path hole pitch P is increased, the second length L2 may be increased but the first length L1 may also be necessarily increased, and therefore, the flow path hole pitch P may satisfy the expression 0.5 mm≤P≤1.5 mm. Further, in order to continue to satisfy the expression 0.5 mm≤P≤1.5 mm, the multiple perforation plate height H and the channel angle θ may be maintained within the above respective ranges.

The expansion parts 111 of the flow path hole 110 are expanded from both sides of the middle point of the flow path hole 110 in the length direction by the fourth length L4, compared to the third length L3, i.e., the width of the flow path hole 110 in the length direction. Here, the fourth length L4 may be greater than ⅔ of the second length L2, i.e., the interval between the flow path holes 110 disposed on the flow path hole central lines nearest to each other (for example, the flow path hole central lines $C_n$ and $C_{n+1}$).

By forming the fourth length L4 to be greater than ⅔ of the second length L2, the third length L3 which is the width of the flow path hole 110 in the length direction is decreased in the state in which the fifth length L5 is fixed, and thus, the second length L2 may be comparatively increased. The increase in the second length L2 may increase the area of the flat portions.

Further, the fourth length L4 may be formed to be less than the second length L2. Thereby, the above Expression 1 may be constantly satisfied, thus being capable of preventing a decrease in the area of the flat portions (L2×⅔<L4<L2).

By forming the flow path holes 110 having the expansion parts 111 in the multiple perforation plate 100, the flat portions are still formed in the part indicated by line A-A of FIG. 4 so as to come in surface contact with the gas diffusion layer, and simultaneously, the second length L2 is increased even in the part indicated by line B-B and thus, the area of portions coming in surface contact with the gas diffusion layer is increased and concentration of stress may be alleviated or prevented.

One example of the multiple perforation plate 100 formed to satisfy the above-described expressions will be described as follows.

The multiple perforation plate 100 is configured to have a channel pitch P of 0.8 mm, and is formed in an uneven shape in which a wave-shaped cross-section is repeated in the flow direction of reaction gas by repeatedly bending the region of the n$^{th}$ flow path hole central line $C_n$ upwards, bending the region of the n+1$^{th}$ flow path hole central line $C_{n+1}$ downwards, and bending the region of the n+2$^{th}$ flow path hole central line $C_{n+2}$ upwards.

Here, the first length L1 indicating the interval between the flow path holes 110 disposed on the flow path hole central lines disposed n+1$^{th}$ nearest to each other (for example, the flow path hole central lines $C_n$ and $C_{n+2}$) and formed at positions corresponding to each other in the width direction may be 0.25-1 mm, and the second length L2 indicating the interval between the flow path holes 110 disposed on the flow path hole central lines disposed n$^{th}$ nearest to each other (for example, the flow path hole central lines $C_n$ and $C_{n+1}$) may be 0.05-0.5 mm.

Further, the third length L3 indicating the width of the flow path hole 110 in the length direction, the fourth length L4 indicating the width of the expansion part 111 protruding from one side of the flow path hole 110, and the fifth length L5 indicating the interval between points of the flow path holes 110 provided with the expansion parts 111 disposed on the flow path hole central lines disposed n+1$^{th}$ nearest to each other (for example, the flow path hole central lines $C_n$ and $C_{n+2}$) and formed at positions corresponding to each other in the width direction may be set based on the relative relationships thereof with the first length L1 and the second length L2 when the first length L1 and the second length L2 are set.

As is apparent from the above description, a multiple perforation plate for fuel cell separators according to embodiments of the present invention may increase the area of flat portions coming in surface contact with a gas diffusion layer by changing the shape of flow path holes formed in the multiple perforation plate.

Therefore, the multiple perforation plate according to embodiments of the present invention may reduce concentration of stress on the gas diffusion layer due to the multiple perforation plate when a fuel cell stack is formed, and thus may reduce physical damage due to contact between the gas diffusion layer and a membrane electrode assembly.

In addition, the multiple perforation plate according to embodiments of the present invention may increase contact resistance due to the increase in the area of the flat portions.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A multiple perforation plate constituting separator of a fuel cell together with a flat plate, the multiple perforation plate comprising:
  a perforation plate body having a wave-shaped cross-section repeating in a flow direction of reaction gas, the wave-shaped cross-section having bent lower portions, bent upper portions, and flat central portions between the bent lower portions and the bent upper portions;
  virtual flow path hole central lines formed along the flat central portion of the perforation plate body and spaced apart from each other at a constant interval in a length direction corresponding to the flow direction of reaction gas, each virtual flow path hole central line extending in a width direction perpendicular to the flow direction of the reaction gas, wherein the flat central portions comprise an ascending nth flow path hole central line Cn and a descending n+1th flow path hole central line Cn+1; and
  a plurality of flow path holes having expansion parts formed at both sides of a middle point in the width direction of each of the flow path holes so that a middle part of the flow path holes is wider in the flow direction than outer parts of the flow path holes, the plurality of flow path holes being formed on the flat central portion of the perforation plate body and spaced at a constant interval on the virtual flow path hole central lines in the width direction.

2. The multiple perforation plate according to claim 1, wherein:
among the flow path holes, flow path holes formed on an nth flow path hole central line Cn are arranged at positions located between flow path holes formed on an n+1th flow path hole central line Cn+1 and aligned with flow path holes formed on an n+2th flow path hole central line Cn+2, so that the flow path holes are arranged in a zigzag pattern in the length direction;
among an interval between the flow path holes disposed on the flow path hole central lines disposed n+1th nearest to each other and formed at positions corresponding to each other in the width direction, a first interval between points of the respective flow path holes provided with the expansion parts is less than a second interval between points of the respective flow path holes other than the expansion parts; and
n is an odd natural number.

3. The multiple perforation plate according to claim 1, wherein:
the expansion parts are respectively expanded from sides of the middle point of each of the flow path holes in the length direction by a designated first width, compared to second width of the flow path holes in the length direction; and
a first interval between corresponding points of the flow path holes disposed on the flow path hole central lines disposed nth nearest to each other, other than the middle points thereof in the width direction, is greater than the first width of each of the expansion parts from a corresponding one of the sides of the flow path holes.

4. The multiple perforation plate according to claim 3, wherein the first width of each of the expansion parts from the corresponding one of the sides of the flow path holes is greater than 2/3 of the first interval between the corresponding points of the flow path holes disposed on the flow path hole central lines disposed nth nearest to each other, other than the middle points thereof in the width direction, but is less than the first interval between the corresponding points of the flow path holes disposed on the flow path hole central lines disposed nth nearest to each other, other than the middle points thereof in the width direction.

5. The multiple perforation plate according to claim 3, wherein the first interval between the corresponding points of the flow path holes disposed on the flow path hole central lines disposed nth nearest to each other, other than the middle points thereof in the width direction, is greater than 1/2 of the second width of the flow path holes in the length direction, but is less than the second width of the flow path holes in the length direction.

6. The multiple perforation plate according to claim 1, wherein the expansion parts are formed in a triangular shape, a rectangular shape, a square shape, a semi-hexagonal shape, a semi-circular shape or a semi-oval shape.

7. The multiple perforation plate according to claim 1, wherein:
among an interval between the flow path holes disposed on the flow path hole central lines disposed n+1th nearest to each other and formed at positions corresponding to each other in the width direction, a first interval between points of the respective flow path holes provided with the expansion parts satisfies an equation $$\text{first interval} \leq H/\sin\theta$$

wherein H indicates a height between the lower bent portions and the upper bent portions of the multiple perforation plate, and $\theta$ indicates an angle between a virtual line corresponding to the first interval and a virtual line formed by connecting the lower bent portions of the multiple perforation plate.

8. The multiple perforation plate according to claim 7, wherein the height H satisfies an expression $0.25\text{ mm} \leq H \leq 0.6\text{ mm}$, and the angle $\theta$ satisfies an expression $$30° \leq \theta \leq 90°.$$

9. The multiple perforation plate according to claim 7, wherein a pitch P between the flow path holes disposed on the flow path hole central lines disposed n+1th nearest to each other satisfies an expression $0.5\text{ mm} \leq P \leq 1.5\text{ mm}$.

10. A method of forming a multiple perforation plate constituting separator of a fuel cell together with a flat plate, the method comprising:
forming a perforation plate body having a wave-shaped cross-section repeating in a flow direction of reaction gas, the wave-shaped cross-section having bent lower portions, bent upper portions, and flat central portions between the bent lower portions and the bent upper portions;
defining virtual flow path hole central lines along the flat central portions of the perforation plate body, the virtual flow path hole central lines spaced apart from each other at a constant interval in a length direction corresponding to the flow direction of reaction gas and each virtual flow path hole central line extending in a width direction perpendicular to the flow direction of the reaction gas, wherein the flat central portions comprise an ascending nth flow path hole central line Cn and a descending n+1th flow path hole central line Cn+1; and
forming a plurality of flow path holes having expansion parts at both sides of a middle point in the width direction of each of the flow path holes so that a middle part of the flow path holes is wider in the flow direction than outer parts of the flow path holes, the plurality of flow path holes being on the flat central portions of the perforation plate body and spaced at a constant interval on the virtual flow path hole central lines in the width direction.

11. The method according to claim 10, wherein:
among the flow path holes, flow path holes formed on an nth flow path hole central line Cn are arranged at positions located between flow path holes formed on an n+1th flow path hole central line Cn+1 and aligned with flow path holes formed on an n+2th flow path hole central line Cn+2, so that the flow path holes are arranged in a zigzag pattern in the length direction;
among an interval between the flow path holes disposed on the flow path hole central lines disposed n+1th nearest to each other and formed at positions corresponding to each other in the width direction, a first interval between points of the respective flow path holes provided with the expansion parts is less than a second interval between points of the respective flow path holes other than the expansion parts; and
n is an odd natural number.

12. The method according to claim 10, wherein:
the expansion parts are respectively expanded from sides of the middle point of each of the flow path holes in the length direction by a designated first width, compared to second width of the flow path holes in the length direction; and
a first interval between corresponding points of the flow path holes disposed on the flow path hole central lines disposed nth nearest to each other, other than the middle points thereof in the width direction, is greater than the first width of each of the expansion parts from a corresponding one of the sides of the flow path holes.

13. The method according to claim 12, wherein the first width of each of the expansion parts from the corresponding one of the sides of the flow path holes is greater than ⅔ of the first interval between the corresponding points of the flow path holes disposed on the flow path hole central lines disposed nth nearest to each other, other than the middle points thereof in the width direction, but is less than the first interval between the corresponding points of the flow path holes disposed on the flow path hole central lines disposed nth nearest to each other, other than the middle points thereof in the width direction.

14. The method according to claim 12, wherein the first interval between the corresponding points of the flow path holes disposed on the flow path hole central lines disposed nth nearest to each other, other than the middle points thereof in the width direction, is greater than ½ of the second width of the flow path holes in the length direction, but is less than the second width of the flow path holes in the length direction.

15. The method according to claim 10, wherein the expansion parts are formed in a triangular shape, a rectangular shape, a square shape, a semi-hexagonal shape, a semi-circular shape or a semi-oval shape.

16. The method according to claim 10, wherein:
among an interval between the flow path holes disposed on the flow path hole central lines disposed n+1th nearest to each other and formed at positions corresponding to each other in the width direction, a first interval between points of the respective flow path holes provided with the expansion parts satisfies an equation first interval ≤ $H/\sin\theta$ wherein H indicates a height between upper ends and lower ends of bent portions of the multiple perforation plate, and θ indicates an angle between a virtual line corresponding to the first interval and a virtual line formed by connecting the lower ends of the bent portions of the multiple perforation plate.

17. The method according to claim 16, wherein the height H satisfies an expression 0.25 mm≤H≤0.6 mm, and the angle θ satisfies an expression 30°≤θ≤90°.

18. The method according to claim 16, wherein a pitch P between the flow path holes disposed on the flow path hole central lines disposed n+1th nearest to each other satisfies an expression 0.5 mm≤P≤1.5 mm.

19. A unit cell for a fuel cell, the unit cell comprising:
a membrane-electrode assembly;
a pair of gas diffusion layers disposed on outer surfaces of the membrane-electrode assembly, respectively; and
a pair of separators disposed on outer sides of the gas diffusion layers, wherein at least one of the separators comprises a multiple perforation plate and a flat plate spaced from the respective gas diffusion layer by the multiple perforation plate;
wherein the multiple perforation plate includes:
a perforation plate body having a wave-shaped cross-section repeating in a flow direction of reaction gas, the wave-shaped cross-section having bent lower portions, bent upper portions, and flat central portions between the bent lower portions and the bent upper portions;
virtual flow path hole central lines along the flat central portions of the perforation plate body and spaced apart from each other at a constant interval in a length direction corresponding to the flow direction of reaction gas, each virtual flow path hole central line extending in a width direction perpendicular to the flow direction of the reaction gas, wherein the flat central portions comprise an ascending nth flow path hole central line Cn and a descending n+1th flow path hole central line Cn+1; and
a plurality of flow path holes having expansion parts formed at both sides of a middle point in the width direction of each of the flow path holes so that a middle part of the flow path holes is wider in the flow direction than outer parts of the flow path holes, the plurality of flow path holes are formed on the flat central portion of the perforation plate body and spaced at a constant interval on the virtual flow path hole central lines in the width direction.

20. The unit cell according to claim 19, wherein:
among the flow path holes, flow path holes formed on an nth flow path hole central line Cn are arranged at positions located between flow path holes formed on an n+1th flow path hole central line Cn+1 and aligned with flow path holes formed on an n+2th flow path hole central line Cn+2, so that the flow path holes are arranged in a zigzag pattern in the length direction;
among an interval between the flow path holes disposed on the flow path hole central lines disposed n+1th nearest to each other and formed at positions corresponding to each other in the width direction, a first interval between points of the respective flow path holes provided with the expansion parts is less than a second interval between points of the respective flow path holes other than the expansion parts; and
n is an odd natural number.

* * * * *